(12) United States Patent
Hartkopp et al.

(10) Patent No.: US 11,113,414 B2
(45) Date of Patent: Sep. 7, 2021

(54) METHOD FOR CONFIGURING MOBILE ONLINE SERVICES

(71) Applicant: VOLKSWAGEN AKTIENGESELLSCHAFT, Wolfsburg (DE)

(72) Inventors: Oliver Hartkopp, Lehre (DE); André Oberschachtsiek, Braunschweig (DE); Hendrik Decke, Braunschweig (DE); Florian Pflug, Braunschweig (DE)

(73) Assignee: VOLKSWAGEN AKTIENGESELLSCHAFT

( * ) Notice: Subject to any disclaimer, the term of this patent is extended or adjusted under 35 U.S.C. 154(b) by 176 days.

(21) Appl. No.: 16/074,815

(22) PCT Filed: Jan. 5, 2017

(86) PCT No.: PCT/EP2017/050187
§ 371 (c)(1),
(2) Date: Aug. 2, 2018

(87) PCT Pub. No.: WO2017/133860
PCT Pub. Date: Aug. 10, 2017

(65) Prior Publication Data
US 2019/0042789 A1 Feb. 7, 2019

(30) Foreign Application Priority Data

Feb. 2, 2016 (DE) ............... 10 2016 101 758.2
Jun. 24, 2016 (DE) ............... 10 2016 211 352.6

(51) Int. Cl.
*G06F 21/62* (2013.01)
*H04W 12/02* (2009.01)
(Continued)

(52) U.S. Cl.
CPC ........ *G06F 21/6245* (2013.01); *G06F 21/604* (2013.01); *G06F 21/6254* (2013.01);
(Continued)

(58) Field of Classification Search
CPC ............... G06F 21/6245; G06F 21/604; G06F 21/6254; H04W 4/42; H04W 4/60; H04W 12/02; G06Q 30/02; H04L 63/104
(Continued)

(56) References Cited

U.S. PATENT DOCUMENTS 8,374,894 B2 * 2/2013 Weinstock ........... G06Q 10/025
                                                    705/5
10,358,116 B1 * 7/2019 Jayaraman .......... H04L 63/1416
(Continued)

FOREIGN PATENT DOCUMENTS

DE     102012009554 A1   11/2012
DE     102013015737 A1    4/2014
(Continued)

OTHER PUBLICATIONS

Crowdsourcing in Intelligent Transportation Systems Kashif Ali, Dina Al-Yaseen, Ali Ejaz, Tayyab Javed Hossam S. Hassanein IEEE Wireless Communications and Networking Conference: Services, Applications, and Business, pp. 1-5 (Year: 2012).*
(Continued)

*Primary Examiner* — Samson B Lemma
*Assistant Examiner* — Mohammad S Shams
(74) *Attorney, Agent, or Firm* — Barnes & Thornburg LLP

(57) ABSTRACT

A method for configuring mobile online services for use with a transportation vehicle including providing a configuration system which assigns data contents to a data release class, providing a selection possibility for a user by the configuration system by which selection possibility the user
(Continued)

allows one or more mobile online services to use the data contents of a data release class, selecting a data release class for the one or more mobile online services, and releasing the data contents of the selected data release class for use by the mobile online service by the configuration system. The method provides for enabling transparent and conveniently usable data protection configuration for the use of mobile online services together with a transportation vehicle which leads to increased trust of customers and potential buyers in the transportation vehicle manufacturer and in the offered mobile online services.

26 Claims, 5 Drawing Sheets

(51) Int. Cl.
| | |
|---|---|
| H04L 29/06 | (2006.01) |
| G06Q 30/02 | (2012.01) |
| H04W 4/60 | (2018.01) |
| H04W 12/03 | (2021.01) |
| H04W 4/42 | (2018.01) |
| G06F 21/60 | (2013.01) |

(52) U.S. Cl.
CPC ........... *G06Q 30/02* (2013.01); *H04L 63/104* (2013.01); *H04W 4/42* (2018.02); *H04W 4/60* (2018.02); *H04W 12/02* (2013.01); *H04W 12/03* (2021.01)

(58) Field of Classification Search
USPC .......................................................... 726/30
See application file for complete search history.

(56) References Cited

U.S. PATENT DOCUMENTS

| | | | | |
|---|---|---|---|---|
| 2003/0023451 | A1* | 1/2003 | Willner ............... | G06F 21/6245 713/151 |
| 2008/0148374 | A1* | 6/2008 | Spaur ................. | B60R 25/1001 726/6 |
| 2009/0326735 | A1* | 12/2009 | Wood .................. | G05D 1/0088 701/2 |
| 2010/0222939 | A1* | 9/2010 | Namburu ............. | B60R 16/037 701/2 |
| 2011/0313663 | A1* | 12/2011 | Kellum .................. | G01S 11/10 701/300 |
| 2013/0084847 | A1* | 4/2013 | Tibbitts .................. | H04W 4/48 455/419 |
| 2013/0099911 | A1* | 4/2013 | Mudalige ............... | G08G 1/166 340/438 |
| 2013/0212659 | A1* | 8/2013 | Maher ..................... | H04W 4/44 726/6 |
| 2014/0309806 | A1* | 10/2014 | Ricci ....................... | G06F 21/32 701/1 |
| 2014/0309849 | A1* | 10/2014 | Ricci ....................... | G01C 21/26 701/33.4 |
| 2015/0178999 | A1* | 6/2015 | Smith ..................... | G07C 5/008 701/31.5 |
| 2015/0199523 | A1* | 7/2015 | Hamilton ................ | G06F 21/60 726/27 |
| 2015/0321641 | A1* | 11/2015 | Abou Mahmoud .... | B60R 25/00 701/2 |
| 2017/0293950 | A1* | 10/2017 | Rathod .............. | G06Q 30/0639 |
| 2018/0218548 | A1* | 8/2018 | Smith ..................... | G07C 5/008 |
| 2019/0097812 | A1* | 3/2019 | Toth ........................ | G06F 21/33 |
| 2020/0015049 | A1* | 1/2020 | Willmann ............. | H04L 63/083 |
| 2020/0068400 | A1* | 2/2020 | Ramic ................... | H04L 63/107 |

FOREIGN PATENT DOCUMENTS

| | | |
|---|---|---|
| DE | 102014005589 A1 | 9/2014 |
| DE | 102013016092 A1 | 4/2015 |
| DE | 102014206545 A1 | 10/2015 |

OTHER PUBLICATIONS

5G Network Slicing forVehicle-to-Everything Services Claudia Campolo, Antonella Molinaro, Antonio Iera, Francesco Menichella IEEE Wireless Communications (vol. 24, Issue: 6, pp. 1-8 . Dec. 2017) (Year: 2017).*

Search Report for International Patent Application No. PCT/EP2017/050187; dated Feb. 28, 2017.

* cited by examiner

METHOD FOR CONFIGURING MOBILE ONLINE SERVICES

PRIORITY CLAIM

This patent application is a U.S. National Phase of International Patent Application No. PCT/EP2017/050187, filed 5 Jan. 2017, which claims priority to German Patent Application Nos. 10 2016 101 758.2, filed 2 Feb. 2016, and 10 2016 211 352.6, filed 24 Jun. 2016, the disclosures of which are incorporated herein by reference in their entireties.

SUMMARY

Illustrative embodiments relate to a method for configuring mobile online services for use with a transportation vehicle and to a configuration system for configuring mobile online services for use with a transportation vehicle.

BRIEF DESCRIPTION OF THE DRAWINGS

The disclosed embodiments will be explained below with reference to the associated drawings, in which.

DETAILED DESCRIPTION

Figure 1:
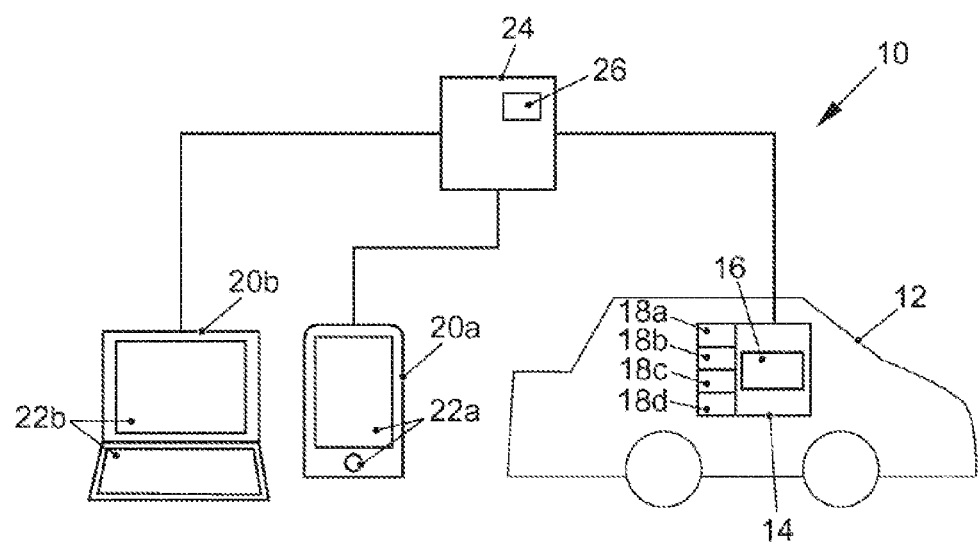
FIG. 1 shows an exemplary embodiment of a disclosed configuration system.

In modern transportation vehicles, it is possible to use mobile online services, by which, for example, current traffic information for use in a transportation vehicle-internal navigation system or media contents for playback by a transportation vehicle-internal entertainment system can be retrieved by a radio link.

The way in which mobile online services can be used in a transportation vehicle will considerably influence the purchasing decision of potential transportation vehicle purchasers in future and the convenient operating and controlling capability of a corresponding system as well as the data protection which is ensured by the system will have a high degree of relevance for the purchasing decision in future.

To protect sensitive data such as, for example, the access data to a personal user profile of a social network which can be retrieved in the transportation vehicle via a mobile service, DE 10 2012 009 554 A1 proposes replacing the inputting of a password by proof of ownership of a communication terminal.

To improve the data protection when using mobile online services, DE 10 2014 206 545 A1 proposes using a communication system which has a plurality of operating modes, with the result that, depending on requirements, a complete, partial or no anonymization of the data to be transmitted can be performed.

Providers of mobile online services are compelled by legislation in many countries to process in a purpose-specific state the data which is made available by the users of the mobile online services, wherein the users have to give their consent to this purpose-specific processing before the use of the respective mobile online service.

When mobile online services are used by mobile terminals such as, for example, smartphones, application-related data release routines are known in which contents are released when an application is used for the first time by the user. The subsequent changing of these data-protection-relevant settings usually entails a high degree of expenditure.

In the case of mobile online services in a transportation vehicle, a general data protection declaration is usually signed by the customer. However, this leads to a situation in which the customer cannot keep track of which specific contents are made available to a mobile online service from the transportation vehicle and for which specific purpose the mobile online service uses these contents.

However, in the past public awareness with respect to data protection has come about. The lack of transparency when mobile online services are used with a transportation vehicle adversely affects the trust of customers and people interested in making a purchase in the transportation vehicle manufacturer. This can even cause products of a manufacturer to be rejected.

The disclosed embodiments provide a possible way of permitting transparent and conveniently usable data protection configuration for the use of mobile online services with a transportation vehicle which gives rise to increased trust of customers and people interested in making a purchase in the transportation vehicle manufacturer and in the mobile online services which are offered.

Disclosed embodiments provide a method or a configuration system.

The disclosed method for configuring mobile online services for use with a transportation vehicle comprises providing a configuration system which assigns data contents to one data release class of a plurality of data release classes. By this configuration system, a user is then provided with a selection possibility by which the user can respectively permit one or more mobile online services to use the data contents of a data release class. The subsequent selection of, in each case, one data release class for the one or more mobile online services can be carried out, for example, manually by the user or automatically by the configuration system. According to the disclosed embodiments, the data contents of the selected data release class are then released for use by the respective mobile online service by the configuration system. The one or more mobile online services can be, for example, mobile online services which are offered by the manufacturer of the transportation vehicle and/or which relate to a parking space assignment service, a product monitor, a navigation service, a weather information service, a remote-diagnostic service, a range assistant, a remote-control service or an online logbook service. Alternatively or additionally, the one mobile online service, or the plurality of mobile online services, can also comprise a package service, a communication service for vehicle-to-vehicle communication and/or vehicle-to-infrastructure communication, a navigation service, a toll booking service or a service of a transportation vehicle (i.e., an automobile) club.

The disclosed method allows for the user of a mobile online service to release particular data contents to the mobile online service in a convenient and easily understandable state. As a result of the selection of a data release class to which particular data contents are assigned, the lack of transparency of the data release is eliminated, since the user can release data contents of a particular category to a mobile online service by a simple instruction. The data release class which is selected for the respective mobile online service may also be recognized quickly and in a clearly understandable way by the configuration system, checked, and, when necessary, modified manually. This ultimately gives rise to increased trust from the customers and people interested in making a purchase in the transportation vehicle manufacturer and the mobile online services which are offered.

The configuration system used in the disclosed method can comprise a transportation vehicle-internal man-machine interface for providing the selection possibility for the user of the configuration system, by which the user can respectively permit the one or more mobile online services to use the data contents of a data release class. Alternatively or additionally, the configuration system used can comprise a transportation vehicle-external man-machine interface for providing the selection possibility for the user of the configuration system, by which the user can respectively permit the one or more mobile online services to use the data contents of a data release class. The transportation vehicle-internal man-machine interface and/or the transportation vehicle-external man-machine interface can comprise, for example, in each case a display unit for visually playing back information and/or one or more input elements for selecting displayed menu options. The transportation vehicle-internal man-machine interface can be embodied, for example, as a transportation vehicle-internal touchscreen. The transportation vehicle-external man-machine interface can be embodied, for example, as part of a mobile terminal, such as a smartphone or a tablet, or as part of a laptop or of a personal computer. By the transportation vehicle-internal man-machine interface, the selection of a respective data release class for the one or more mobile online services can be made directly in the transportation vehicle, with the result that a rapid modification of the release setting can be made while the transportation vehicle is being used. As a result of the transportation vehicle-external man-machine interface, the selection of a respective data release class for the one or more mobile online services can be made from a location which is remote from the transportation vehicle, for example, from the user's workplace or living room. This further increases the convenience of the configuration.

The transportation vehicle-internal man-machine interface can be assigned to a transportation vehicle-internal configuration unit. The transportation vehicle-internal configuration unit is, for example, an operator control device which is arranged inside the dashboard of the transportation vehicle. Furthermore, the transportation vehicle-external man-machine interface can be assigned to a transportation vehicle-external configuration unit. The transportation vehicle-external configuration unit is, for example, a mobile terminal, such as a smartphone or a tablet, or a laptop or personal computer. The transportation vehicle-internal configuration unit and the transportation vehicle-external configuration unit are connected in a signal-conducting state to a central computer. The signal-conducting connection may be a radio link and/or an Internet connection. The method also comprises updating a configuration profile, stored on the central computer, in accordance with the configuration settings made by the transportation vehicle-internal configuration unit and/or updating a configuration profile, stored on the central computer, in accordance with the configuration settings made by the transportation vehicle-external configuration unit. So that corresponding synchronization can take place, the method can also comprise retrieving a configuration profile, stored on the central computer, by the transportation vehicle-internal configuration unit and/or the transportation vehicle-external configuration unit and/or selecting in each case a data release class for the one or more mobile online services by the configuration system in accordance with the retrieved configuration profile. As a result of the storage of a configuration profile on a central computer, the configuration settings which are made are stored centrally and can be adapted at any time and independently of location by corresponding updating. The possibility of being able to retrieve the updated configuration profile, for example, automatically whenever the transportation vehicle starts, eliminates the need for costly manual synchronization, for example, by setting up a temporary ad-hoc connection.

The plurality of data release classes can comprise at least one data release class for environmental data contents, wherein the environmental contents may be assigned information relating to the external temperature, the precipitation and/or the detected parking spaces. The user can release the data contents of this data release class to a parking space assignment service to himself obtain information about parking space probabilities on a section of a map displayed by a navigation system. The user can release the data contents of this data release class to a navigation service himself to obtain information relating to current road signs, roadworks or lane widths. The at least one data release class for environmental data contents can comprise, in addition to the environmental data contents, further data contents which are not environmental data contents.

The plurality of data release classes can comprise at least one data release class for transportation vehicle data contents, wherein the transportation vehicle data contents may be assigned information relating to the transportation vehicle type, the transportation vehicle identification number, relating to a pseudonymized transportation vehicle number, the oil level, the engine temperature, the kilometer reading and/or fault reports. When the transportation vehicle data contents are selected for a mobile online service, at the same time all the environmental data contents may be released for use by the mobile online service. The user can release the data contents of this data release class to a product monitor, to obtain himself information and messages about workshop actions for his transportation vehicle. The at least one data release class for transportation vehicle data contents can comprise, in addition to the transportation vehicle data contents, further data contents which are not transportation vehicle data contents.

The plurality of data release classes can also comprise at least one data release class for data contents which relate to the driving behavior of the user, wherein the data contents which relate to the driving behavior of the user may be assigned information relating to the destination, the route, telemetry data and/or sensor data. The data contents which relate to the driving behavior of the user can be assigned directly to the user. Alternatively, the data contents which relate to the driving behavior of the user can be assigned to a pseudonym of the user. When the data contents which relate to the driving behavior of the user are selected, all the environmental data contents and transportation vehicle data contents for a mobile online service may be released for use by the mobile online service. The user can release the data contents of this data release class to a parking space assignment service, himself to obtain information relating to the optimization of the walking distance or the period for searching for a parking space. The user can release the data contents of this data release class to a product monitor, himself to obtain predictive maintenance information and wear information for his transportation vehicle. The user can release the data contents of this data release class to a navigation service, himself to obtain lane-precise navigation information and speed suggestions for optimizing the travel time and/or the convenience. The at least one data release class for data contents which relate to the driving behavior of the user can comprise, in addition to the data contents which relate to the driving behavior of the user, further data contents which do not relate to the driving behavior of the user.

The plurality of data release classes can comprise at least one data release class for personal data contents, wherein the personal data contents may be assigned information relating to the name and/or the address of the user, the destination, the route and/or telemetry data. When the personal data contents are selected for a mobile online service, all the surroundings data contents, transportation vehicle data contents and data contents which relate to the driving behavior of the user may be simultaneously released for use by the mobile online service. The user can release the data contents of this data release class to a parking space assignment service, himself to be able to carry out parking space bookings with participating providers of parking spaces. The user can release the data contents of this data release class to a product monitor, to be able to carry out himself predictive maintenance planning and repair planning, with corresponding agreement of scheduling. The user can release the data contents of this data release class to a package service to permit package deliveries into the trunk of his transportation vehicle. The at least one data release class for personal data contents can comprise, in addition to the personal data contents, further data contents which are not personal data contents.

The plurality of data release classes can comprise at least one data release class which is assigned no data contents. Additionally or alternatively, the plurality of data release classes have a ranking, wherein a higher-ranking data release class comprises the data contents of the lower-ranking data release classes. By selecting the data release class to which no data contents are assigned the user can prevent, for a mobile online service, data from being released to the mobile online service.

However, it is possible that despite the selection of this data release class information or user data is made available to the user. This can occur for ethical or else for economic reasons. The data release class for personal data contents may have a higher ranking than the data release class for data contents which relate to the driving behavior of the user. The data release class for data contents which relate to the driving behavior of the user may have a higher ranking than the data release class for transportation vehicle data contents. The data release class for transportation vehicle data contents may have a higher ranking than the data release class for environmental data contents.

The method can comprise displaying the data contents which are assigned to a data release class, by the transportation vehicle-internal man-machine interface and/or the transportation vehicle-external man-machine interface. This permits the user to acquire information about the data contents which are specifically assigned to the respective data release classes. The data release classes can be assigned to a system of levels, wherein, for example, the data release class for environmental data contents is assigned the level 1, the data release class for transportation vehicle data contents is assigned the level 2, the data release class for data contents which relate to the driving behavior of the user is assigned the level 3, the data release class for personal data contents is assigned the level 4, and the data release class to which no data contents are assigned is assigned the level 0. The system of levels and the possibility of being able to acquire the data contents which are assigned specifically to each level permits the user to make, after some time, an intuitive selection of the release level which he desires for a specific mobile online service. This gives rise to a considerable increase in the configuration convenience.

Alternatively or additionally, the method can comprise displaying the data release class respectively selected for the one or more mobile online services, by the transportation vehicle-internal man-machine interface, and/or the transportation vehicle-external man-machine interface and/or displaying the data contents, used by the one or more mobile online services, of a data release class, by the transportation vehicle-internal man-machine interface and/or the transportation vehicle-external man-machine interface. Displaying the data contents of a data release class which are used by the one or more mobile online services permits the user to determine, before the selection and/or after the selection of a data release class for a mobile online service, which data contents are specifically released for use by the mobile online service or are already released.

By this precise specification of the data contents it is also possible for users who are extremely aware of data protection to obtain sufficient information about the use and release of data, thereby avoiding entirely any adverse affects on customer trust through any lack of transparency which may occur. The method can also comprise displaying a configuration overview of all the mobile online services and the data release class selected for the respective mobile online service, by the transportation vehicle-internal man-machine interface and/or the transportation vehicle-external man-machine interface. This configuration overview serves for the purpose of rapid recognition of the overall configuration and permits the user to recognize quickly incorrect configurations which have been inadvertently made for individual mobile online services, with the result that a data release class for the affected mobile online service can be re-selected in close to real-time conditions.

The respective mobile online services can permit the selection of all the data release classes or the selection of just one data release class or the selection of just a number of data release classes. This depends on whether the respective mobile online service requires the data contents of the respective data release class to provide the function for the users of the mobile online service. The data release classes which can theoretically be selected but are instantaneously not selected for the respective mobile online services may also be presented in the configuration overview. In this way, an overview of the possible alternative configurations which can be recognized quickly is displayed to the user, which further improves the operator convenience.

The configuration system which is used to execute the method respectively assigns to the one or more mobile online services for one or more data release classes one or more use functions and/or reception data items which can be used by the user by the mobile online service when the corresponding data release class is selected. As a result of the dependence of the usable functions and/or reception data items on the selected data release class, a community concept is implemented, according to which a user makes a contribution, specifically the provision of data, and in return for this contribution can use a function of a mobile online service. The usable functions of a mobile online service expand when the scope of the data which is released increases.

When the data release class for environmental data contents for a parking space assignment service is selected, the user is provided, for example, with the possibility of obtaining information about parking space probabilities on a section of a map which is displayed by a navigation system. When the data release class for data contents which relate to the driving behavior of the user is selected, for a parking space assignment service, the user is provided, for example, with the possibility of obtaining information about optimization of the walking distance or the period for searching for a parking space. When the data release class for personal data contents is selected for a parking space assignment service, the user is provided, for example, with the possibility of being able to carry out parking space bookings with participating providers of parking spaces. In contrast, when the data release class to which no data contents are assigned is selected, the parking space assignment service cannot be used.

When the data release class for transportation vehicle data contents for a product monitor is selected, the user is provided, for example, with the possibility of obtaining information and messages about workshop actions for his transportation vehicle. When the data release class for data contents which relate to the driving behavior of the user for a product monitor is selected, the user is provided, for example, with the possibility of obtaining predictive maintenance information and wear information for his transportation vehicle. When the data release class for personal data contents of a product monitor is selected, the user is provided, for example, with the possibility of being able to carry out predictive maintenance planning and repair planning with corresponding agreement of scheduling. In contrast, when the data release class to which no data contents are assigned is selected, the product monitor cannot be used.

When the data release class for environmental data contents for a navigation service is selected, the user is provided, for example, with the possibility of obtaining information relating to current road signs, roadworks and lane widths. When the selection of the data release class for data contents which relate to the driving behavior of the user is selected for a navigation service, the user is provided, for example, with the possibility of obtaining lane-precise navigation information and speed suggestions for optimizing the travel time and/or the convenience. When the data release class to which no data contents are assigned a selected for a navigation service, the user is merely provided, for example, with the possibility of obtaining information about hazardous locations.

Furthermore, the configuration system which is used to execute the method respectively assigns, to the one or more mobile online services for one or more data release classes in accordance with the community concept, one or more transmission data items which are processed and/or passed on by the mobile online service when the corresponding data release class is selected.

When the data release class for environmental data contents is selected for a parking space assignment service, for example, the data of the parking sensors are processed and/or passed on by the parking space assignment service. When the data release service for data contents which relate to the driving behavior of the user is selected for a parking space assignment service, for example, the selected destination and the selected route are processed and/or passed on by the parking space assignment service. When the data release service for personal data contents for a parking space assignment service is selected, for example, personal information relating to the booking of a parking space is processed and/or passed on by the parking space assignment service. In contrast, when the data release class to which no data contents are assigned is selected, the parking space assignment service does not process any data and/or does not pass on any data to other users of the parking space assignment service.

When the data release class for the transportation vehicle data contents for a product monitor is selected, for example, the diagnostic data of the transportation vehicle in question are processed and/or passed on by the product monitor. When the data release class for data contents which relate to the driving behavior of the user are selected for a product monitor, for example, the driver's own use profiles and driving profiles are processed and/or passed on by the product monitor. When the data release class for personal data contents are selected for a product monitor, for example, personal information relating to the agreement of scheduling are processed and/or passed on by the product monitor. In contrast, when the data release class to which no data contents are assigned is selected, the product monitor does not process any data and/or does not pass any data to other users of the product monitor.

When the data release class for environmental data contents for a navigation service is selected, for example, the data of the road sign detection system and parking sensors and the detected traffic density are processed and/or passed on by the navigation service. When the data release class for data contents which relate to the driving behavior of the user is selected, for example, the selected destination and the selected route as well as acceleration values and braking values are processed and/or passed on by the navigation service. In contrast, when the data release class to which no data contents are assigned is selected, the navigation service does not process any data and/or does not pass on any data to other users of the navigation service.

The method can comprise displaying the one or more use functions and/or reception data items which can be used by the user by the mobile online service when the corresponding data release class is selected, and/or displaying the one or more transmission data items which are processed and/or passed on by the mobile online service when the corresponding data release class is selected. If the use functions and/or reception data items and the transmission data items which are processed and/or passed on by the mobile online service are displayed simultaneously to the user, the user is alerted visually to the community concept. This permits the user to recognize quickly which reciprocal service he receives from the mobile online service for providing his data. This gives rise to a further increase in the transparency and therefore gives rise to a high level of trust of the user in the transportation vehicle manufacturer in terms of the appropriate use of the released data.

The configuration system which is used to execute the method can comprise a configuration assistant which requests the user to answer a plurality of questions, wherein the configuration assistant respectively proposes, an assignment of a data release class to the one or more mobile online services on the basis of the responses given by the user. The method can display, for example, in addition to individual questions or all the questions, additional information which relates to the consequences of the selection of the answer by the user. The plurality of questions can comprise, for example, three, four, five, six, seven or eight questions. The configuration assistant can request the user, for example, to answer the following questions and/or display the following additional information:

Question: "Would you like to receive additional information on your current position anonymously?";

Additional information: "Parking space probabilities, highly precise traffic information, weather information";

Question: "Would you like to receive current information on your transportation vehicle anonymously?";

Additional information: "Maintenance information, workshop information";

Question: "Would you like to use online services relating to your transportation vehicle to improve navigation and your driving experience?";

Additional information: "Lane-precise navigation information, individual service intervals, online optimized routes";

Question: "Would you like to have the possibility of making bookings from your transportation vehicle?";

Additional information: "Workshop appointments, booking of parking spaces, restaurant reservations";

Question: "Would you also like to use services which are provided by the transportation vehicle manufacturer in cooperation with other providers?";

Additional information: "Delivery of packages to the transportation vehicle, automatic toll collection".

The configuration system which is used to execute the method can have a memory in which a data release class which is to be suggested is stored for one or more mobile online services for each response combination of the user. After the plurality of questions of the configuration assistant have been answered by the user, a corresponding suggestion of a data release class can therefore be generated on the basis of the data stored in the memory. The execution of the data protection configuration using such a configuration assistant brings about a considerable simplification of the configuration process. There is therefore no need for the user to have to select a data release class for each individual mobile online service. The duration of the configuration is therefore also considerably reduced.

The disclosed configuration system comprises a transportation vehicle with a transportation vehicle-internal configuration unit and a transportation vehicle-external configuration unit. The disclosed configuration system is configured to execute the method for configuring mobile online services for use with a transportation vehicle according to at least one of the embodiments described above. The same benefits and modifications as described above apply.

The various embodiments specified in this application can, unless stated otherwise in an individual case, be combined with one another.

FIG. 1 shows an exemplary embodiment of the configuration system 10 for configuring mobile online services 18a-18d for use with a transportation vehicle 12. The illustrated configuration system 10 comprises a transportation vehicle 12, two transportation vehicle-external configuration units 20a, 20b and a central computer 24. The transportation vehicle 12 has a transportation vehicle-internal configuration unit 14 which is connected in a signal-conducting state to the central computer 24. The two transportation vehicle-external configuration units 20a, 20b are also connected in a signal-conducting state to the central computer 24. The configuration system 10 is configured to execute the method for configuring mobile online services 18a-18d for use for the transportation vehicle 12 as claimed in one of claims 1 to 14.

The transportation vehicle-internal configuration unit 14 has a transportation vehicle-internal man-machine interface 16. The two transportation vehicle-external configuration units 20a, 20b likewise each have a man-machine interface 22a, 22b. By the man-machine interfaces 16, 22a, 22b, a user is provided with a selection possibility by which the user respectively permits the use of the data contents of a data release class to the plurality of mobile online services 18a-18d. After the selection of a data release class for a mobile online service 18a-18d, the corresponding data contents which are assigned to the data release class are released for use by the respective mobile online service 18a-18d by the configuration system 10.

The central computer 24 comprises a memory 26 in which the configuration profile of the user can be stored. Therefore, a configuration profile which is stored in the central computer 24 can be updated in accordance with the configuration settings made by the transportation vehicle-internal configuration unit 14. Furthermore, a configuration profile which is stored in the central computer 24 can be updated in accordance with the configuration settings made by the transportation vehicle-external configuration units 20a, 20b. Moreover, a configuration profile which is stored in the central computer 24 can be retrieved by the transportation vehicle-internal configuration unit 14 and the transportation vehicle-external configuration units 20a, 20b.

The plurality of data release classes comprise a data release class for environmental data contents, a data release class for transportation vehicle data contents, a data release class for data contents which relate to the driving behavior of the user, a data release class for personal data contents and a data release class to which no data contents are assigned.

Figure 2:
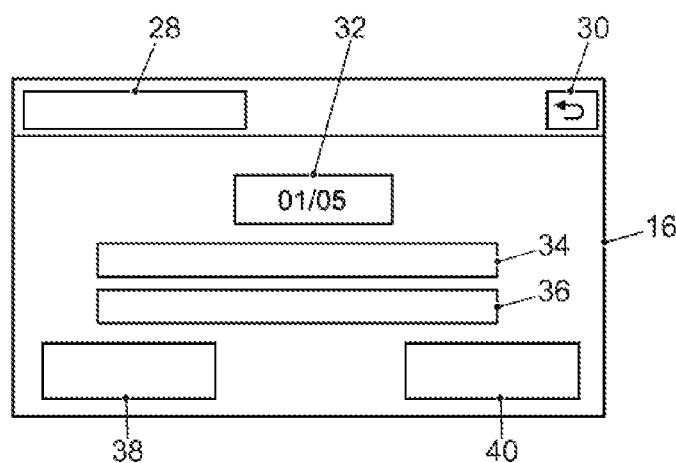
FIG. 2 shows a transportation vehicle-internal touchscreen of a disclosed configuration system when the configuration assistant is being executed.

FIG. 2 shows a transportation vehicle-internal man-machine interface 16, embodied as a touchscreen, of a configuration system 10 while the configuration assistant is being executed. The configuration assistant can be retrieved via the menu prompting of the configuration system 10 or is additionally executed automatically when the configuration system 10 is first put into service. The configuration assistant requests the user to answer a plurality of questions.

On the basis of the responses given by the user, the configuration assistant proposes an assignment of a data release class for one or more mobile online services 18a-18d. While the configuration assistant is being executed, the depicted illustration is displayed to the user. The illustration comprises a display field 28 which can display, for example, the indication "selection assistant". The display panel 28 displays to the user that the configuration assistant is being executed instantaneously. The illustration comprises a display panel 30 which displays an arrow. The user can exit the configuration assistant by touching the touchscreen at the corresponding location. The illustration also comprises a display panel 32 which displays the number of the question which is instantaneously displayed in the display panel 34 as well as the total number of questions to be answered, wherein in the illustrated situation the first question of a total of five questions is represented in the display panel 34. The illustration also comprises a display panel 36 which displays additional information relating to the question illustrated in the display panel 34, wherein the additional information relates to the consequences of the selection of a response by the user.

The display panel can display, for example, one of the following questions: "Would you like to receive additional information on your current position anonymously?", "Would you like to receive current information on your transportation vehicle anonymously?", "Would you like to use online services relating to your transportation vehicle to improve navigation and your driving experience?", "Would you like to have the possibility of making bookings from your transportation vehicle?" or "Would you also like to use services which are provided by the transportation vehicle manufacturer in cooperation with other providers?". The display panel 38 can be touched by the user to answer the question displayed in the display panel 34. For example, the display panel includes the indication "No". The display panel 40 can also be touched by the user to answer the question displayed in the display panel 34. For example, the display panel contains the indication "Yes".

Figure 3:
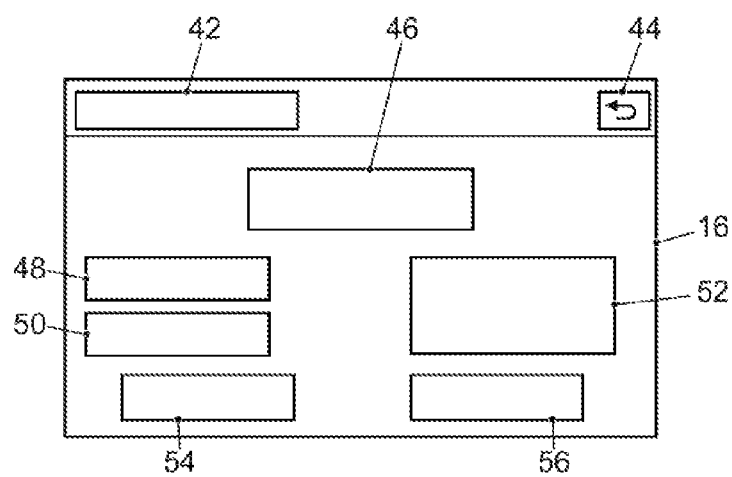
FIG. 3 also shows a transportation vehicle-internal touchscreen of a disclosed configuration system when the configuration assistant is being executed.

FIG. 3 also shows a transportation vehicle-internal man-machine interface 16, embodied as a touchscreen, of a configuration system 10 while the configuration assistant is being executed. The illustration shows a suggestion of a data release class which corresponds to the data protection awareness of the user on the basis of the responses given by the user. To generate a suitable suggestion, the configuration assistant has a memory in which a data release class which is to be suggested for one or more mobile online services is stored for each combination of responses by the user. The illustration comprises a display panel 42 which can display, for example, the indication "selection result". The display panel 42 displays to the user that the configuration assistant is currently being executed. The illustration comprises a display panel 44 which displays an arrow.

The user can exit the configuration assistant by touching the touchscreen at the corresponding location. The illustration also comprises a display panel 46 in which the suggestion of the configuration assistant is displayed. For example, the display panel 46 can display one of the following phrases: "Your details correspond to the greatest extent with data release level 1—environmental data", "Your details correspond to the greatest extent with data release level 2—environmental data and transportation vehicle data", "Your details correspond to the greatest extent with data release level 3—environmental data, transportation vehicle data and driving behavior", "Your details correspond to the greatest extent with data release level 4—environmental data and transportation vehicle data, driving behavior and personal data" or "Your details correspond to the greatest extent with data release level 0—off". For example, that data content of the data release class proposed in the display panel 46 which is most suitable for identifying the user can be displayed in the display panel 48.

Data contents which are released when the proposed data release class is selected can be displayed in the display panel 50. The display panel 52 can comprise a graphic illustration which is assigned to the data release class which is suggested in the display panel 46. The display panel 54 can be touched by the user to reject the suggestion displayed in the display panel 46. For example, the display panel 54 contains the indication "Reject". The display panel 56 can be touched by the user to accept the suggestion displayed in the display panel 46. For example, the display panel 46 contains the indication "Accept".

Figure 4:
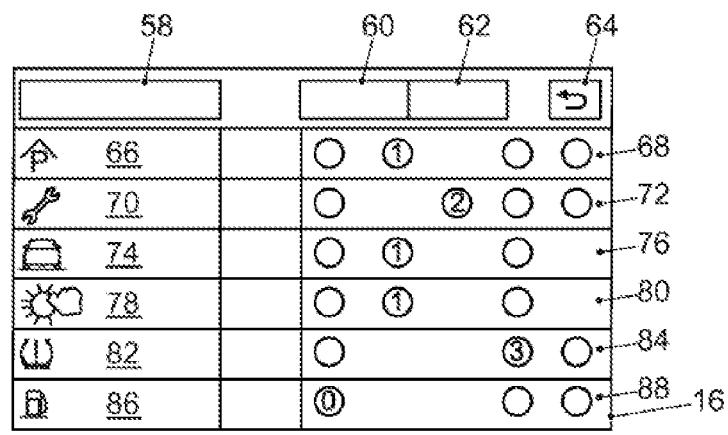
FIG. 4 shows a transportation vehicle-internal touchscreen of a disclosed configuration system while a configuration overview is being displayed.

FIG. 4 shows a transportation vehicle-internal man-machine interface 16, embodied as a touchscreen, of a configuration system 10 during the displaying of a configuration overview. The illustration comprises a display panel 58 which can display the indication "Data release", for example. The display panel 58 is used to indicate to the user that the configuration overview is currently being displayed. The illustration comprises a display panel 64 which displays an arrow. The user can exit the configuration overview by touching the touchscreen at the corresponding location. The configuration overview lists in the display panels 66, 70, 74, 78, 82, 86 all the mobile online services which can be configured with the configuration system 10. In addition, the configuration overview displays in the display panels 68, 72, 76, 80, 84, 88 the data release class which is selected for the respective mobile online service.

The display is provided by the characterization of a corresponding circle by a corresponding number, wherein the number corresponds to a data release class. In the exemplary embodiment shown, a differentiation is made between a total of five different data release classes which are characterized by the numbers 0, 1, 2, 3 and 4. The configuration overview also constitutes, for the individual mobile online services, the theoretically selectable but currently not selected data release classes. This is done by displaying corresponding circles in the display panels 68, 72, 76, 80, 84, 88, wherein these data release classes are characterized as not selected to the user by virtue of the fact that a number is not arranged within these circles. Two further display panels 60, 62 are arranged above the display panels 68, 72, 76, 80, 84, 88. The mobile online services of the transportation vehicle manufacturer can be displayed to the user by touching the display panel 60. For example, the display panel 60 contains an indication which represents the name of the transportation vehicle manufacturer. By touching the display panel 62, the mobile online services of providers other than the transportation vehicle manufacturer can be displayed to the user. For example, the display panel 62 includes the indication "Other providers".

Figure 5:
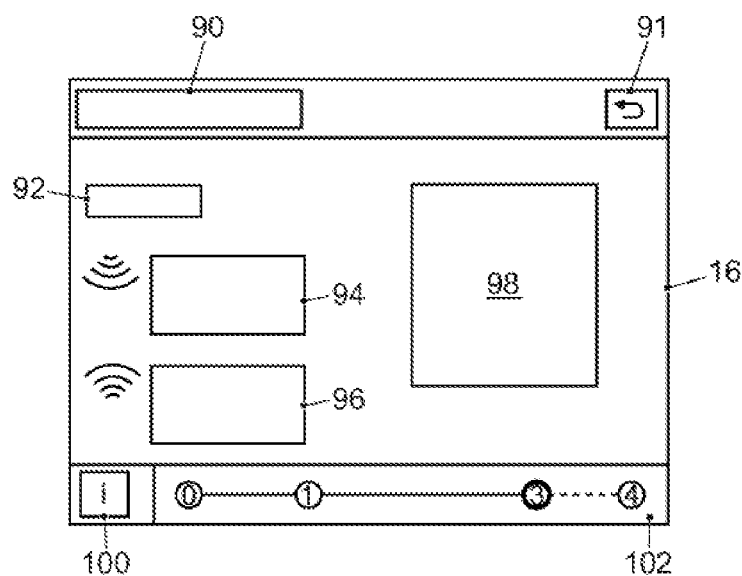
FIG. 5 shows a transportation vehicle-internal touchscreen of a disclosed configuration system while the configuration of a mobile online service is being displayed.

FIG. 5 shows a transportation vehicle-internal man-machine interface 16, embodied as a touchscreen, of a configuration system 10 while the configuration of a mobile online service is being displayed. The illustration comprises a display panel 90 which represents the designation of the mobile online service and displays, for example, the indication "product monitor". The display panel 90 displays to the user that the configuration of a selected mobile online service is currently being displayed. The illustration comprises a display panel 91 which displays an arrow. The user can exit the configuration of the mobile online service by touching the touchscreen at the corresponding location. The display panels 92 and 102 show the data release class which is currently selected for the mobile online service.

The display panel 92 can for this purpose contain one of the following indications: "Level 0", "Level 1", "Level 3" or "Level 4". The display panel 102 indicates the data release class selected for the mobile online service, by placing a visually striking circle around the corresponding number. The display panel 94 displays to the user the use functions and reception data which can be used by the user by the mobile online service when the data release class specified in the display panel 92 is selected. The display panel 96 displays to the user the transmission data which are processed by the mobile online service when the data release class specified in the display panel 92 is selected, and are passed on to other users of the mobile online service. The display panel 98 can comprise a graphic illustration which is assigned to the mobile online service or the selected data release class. The user can also retrieve further information relating to the data release of the mobile online service for the selected data release class by touching the touchscreen in the region of the display panel 100.

Figure 6:
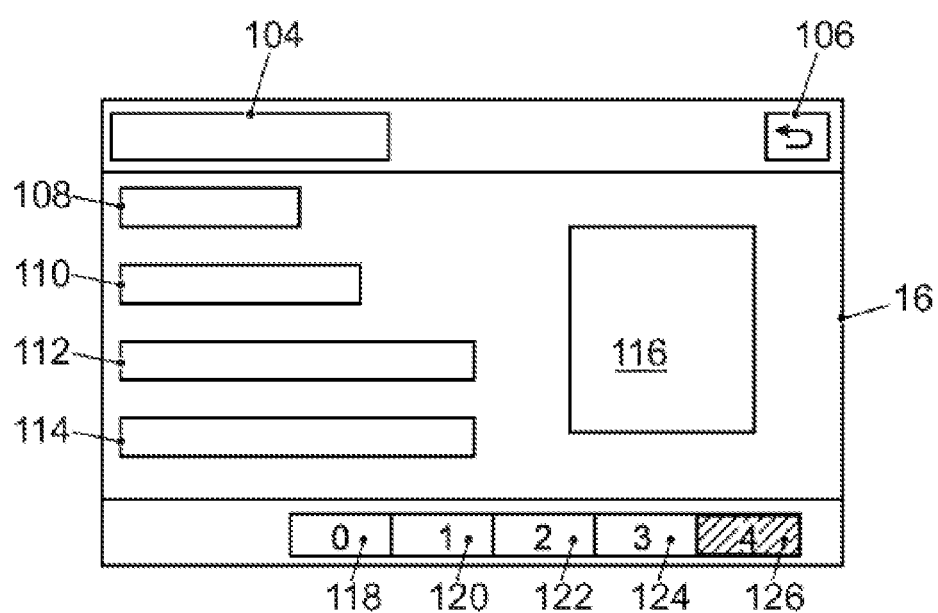
FIG. 6 shows a transportation vehicle-internal touchscreen of a disclosed configuration system while a data release class is being displayed.

FIG. 6 shows a transportation vehicle-internal man-machine interface 16, embodied as a touchscreen, of a configuration system 10 while a data release class is being displayed. The illustration comprises a display panel 104 which includes, for example, the indication "Data release levels". The display panel 104 displays to the user that details relating to a data release class are currently being displayed. The illustration displays a display panel 106 which displays an arrow. The user can exit the display of details on the data release class by touching the touchscreen at the corresponding location. The display panels 108, 126 display the currently selected data release class. The display panel 108 can for this purpose contain, for example, one of the following indications: "Level 0", "Level 1", "Level 3" or "Level 4".

The display panel 126 is visually highlighted compared to the display panels 118, 120, 124, since the data release class 4 is currently selected. The data panel 110 displays the data contents of the data release class represented in the display panel 108. The display panel 110 can comprise, for example, one of the following indications: "Environmental data", "Vehicle status", "Driving behavior", "Personal data" or "Off". The display panel 112 can display, for example, that data content of the data release class represented in the display panel 108 which is most suitable for identifying the user. The display panel 114 can display data contents which are released for the data release class represented in the display panel 108. The display panel 116 can comprise a graphic illustration which is assigned to the data release class represented in the display panel 108.

Figure 7:
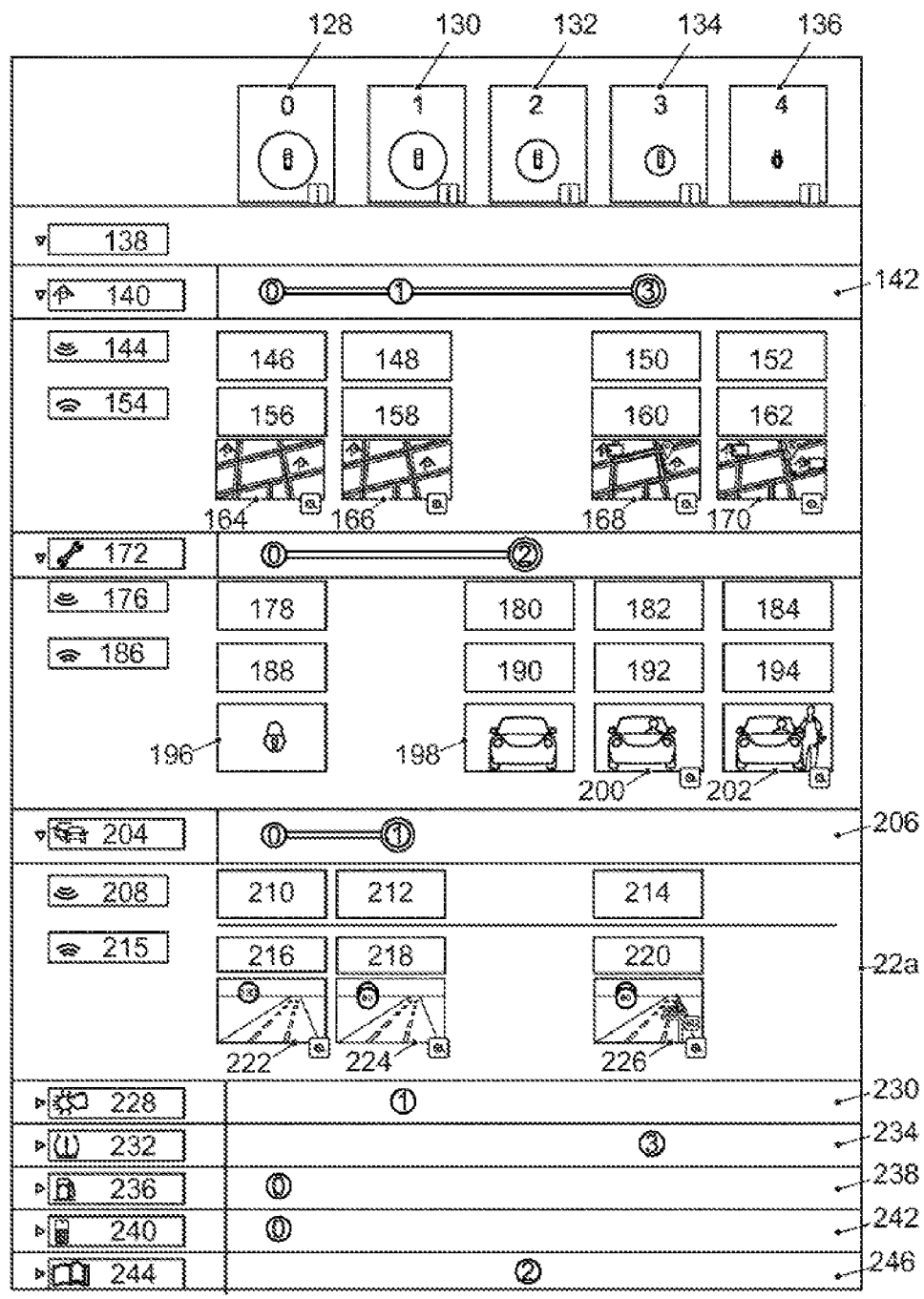
FIG. 7 shows a transportation vehicle-external display unit of a disclosed configuration system while a configuration overview is being displayed.

FIG. 7 shows a transportation vehicle-external man-machine interface 22a, embodied as a display unit, of a disclosed configuration system while a configuration overview is being displayed. The display panels 128, 130, 132, 134, 136 show the selectable data release classes, wherein the data panels 128, 130, 132, 134, 136 each contain, for characterizing the respective data release class, one of the numbers 1-5 and a corresponding graphic illustration. The mobile online services are listed underneath the selectable data release classes. For this purpose, the data panels 140, 172, 204, 228, 232, 236, 240, 244 each contain a corresponding graphic illustration which can be a service-specific logo as well as the designation of the respective mobile online service.

The mobile online services which are specified in the display panels 140, 172, 204, 228, 232, 236, 240, 244 are mobile online services which are made available by the transportation vehicle manufacturer. To characterize this fact the transportation vehicle manufacturer is designated in the display panel 138, wherein the display panels 140, 172, 204, 228, 232, 236, 240, 244 are not displayed to the user until the display panel 138 is selected, for example, by a mouse click, as is the case in the illustration.

The display panels 142, 174, 206, 230, 234, 238, 242, 246 display the data release classes which can be selected for the respective mobile online service as well as the data release class which is currently selected for the respective mobile online service. The display panels 142, 174, 206, 230, 234, 238, 242, 246 display a horizontal line for this purpose, wherein in each case a circle with a number is arranged at the level of the display panels 128, 130, 132, 134, 136 if the respective mobile online service provides for the selection of the corresponding data release class. The number which is arranged in the respective circles corresponds to the number which is also displayed on the corresponding display panel 128, 130, 132, 134, 136 above the respective circle.

The user can retrieve further information relating to the respective mobile online service and its configuration possibilities by a mouse click on the display panels 140, 172, 204, 228, 232, 236, 240, 244. In the illustration, the display panels 140, 172, 204 have already each been selected by a mouse click. The use functions and reception data which can be used by the user by a mobile online service when the data release classes specified in the display panels 142, 174, 206 are displayed to the user by the display panels 146, 148, 150, 152, 178, 180, 182, 184, 210, 212, 214 which are respectively arranged to the right next to the display panels 144, 176, 208. The display panels 144, 176, 208 have, for the purpose of characterization, the indication "Receive". The display panels 156, 158, 160, 162, 188, 190, 192, 194, 216, 218, 220 which are each arranged to the right next to the display panels 154, 186, 215 display to the user the transmission data which, when the data release classes specified in the display panels 142, 174, 206 are selected, are processed by the mobile online service and/or passed on to other users of the respective mobile online service. The display panels 154, 186, 215 have, for the purpose of characterization, the indication "Release". The display panels 164, 166, 168, 170, 196, 198, 200, 202, 222, 224, 226 display a graphic illustration which is assigned to the mobile online service and to the respective data release class.

By virtue of the use of data release classes and a corresponding assignment of, in each case, one data release class to a mobile online service, the disclosure, therefore, permits transparent and conveniently usable data protection configuration for the use of mobile online services with a transportation vehicle. The disclosed configuration method and the disclosed configuration system considerably increase the trust of customers and people interested in making purchases in the transportation vehicle manufacturer and the mobile online services which are offered.

LIST OF REFERENCE NUMBERS

10 Configuration system
12 Transportation vehicle
14 Transportation vehicle-internal configuration unit
16 Transportation vehicle-internal man-machine interface
18a-18d Mobile online services
20a, 20b Transportation vehicle-external configuration units
22a, 22b Transportation vehicle-external man-machine interfaces
24 Central computer
26 Memory
28-246 Display panels

The invention claimed is:

1. A method for configuring mobile online services for use with a transportation vehicle, the method comprising:
defining, by a configuration system, at least two data release classes of a plurality of predetermined data release classes, wherein defining includes assigning data contents to at least one of the at least two data release classes different from data contents assigned to another of the at least two data release classes;
enabling a selection input for a user by the configuration system, by which selection input the user respectively authorizes one or more mobile online services to use the data contents of at least one of the plurality of predetermined data release classes to increase transparency in the data to be released via simple instruction to increase the user's trust;
executing selection, responsive to user input via the selection input, of at least one data release class of the plurality of data release classes for the one or more mobile online services; and responsive to executed selection, releasing the data contents of the selected data release class for use by the respective mobile online service by the configuration system, wherein the configuration system comprises at least one of a transportation vehicle-internal man-machine interface and a transportation vehicle-external man-machine interface for providing the selection input for the user of the configuration system, by which the user respectively permits the one or more mobile online services to use the data contents of the selected data release class, wherein the at least one man-machine interface is implemented using at least one hardware processor.

2. The method of claim 1, wherein the transportation vehicle-internal man-machine interface is assigned to a transportation vehicle-internal configuration unit, and the transportation vehicle-external man-machine interface is assigned to a transportation vehicle-external configuration unit, wherein the transportation vehicle-internal configuration unit and the transportation vehicle-external configuration unit are connected in a signal-conducting way to a central computer, and wherein the computer also comprises at least one of the following:

updating a configuration profile stored on the central computer in accordance with the configuration settings made by the transportation vehicle-internal configuration unit;

updating a configuration profile stored on the central computer in accordance with the configuration settings made by the transportation vehicle-external configuration unit;

retrieving a configuration profile stored on the central computer by the transportation vehicle-internal configuration unit and/or the transportation vehicle-external configuration unit; and selecting in each case one data release class for the one or more mobile online services by the configuration system in accordance with the retrieved configuration profile.

3. The method of claim 1, wherein the plurality of data release classes comprise at least one data release class for environmental data contents, wherein the environmental contents are assigned information relating to the external temperature, the precipitation and/or the detected parking spaces.

4. The method of claim 1, wherein the plurality of data release classes comprise at least one data release class for transportation vehicle data contents, wherein the transportation vehicle data contents are assigned information relating to the transportation vehicle type, the transportation vehicle identification number, a pseudonymized transportation vehicle number, the oil level, the engine temperature, the kilometer reading and/or fault reports.

5. The method of claim 1, wherein the plurality of data release classes comprise at least one data release class for data contents which relate to the driving behavior of the user, wherein the data contents which relate to the driving behavior of the user are assigned information relating to the destination, route, telemetry data and/or sensor data.

6. The method of claim 1, wherein the plurality of data release classes comprise at least one data release class for personal data contents, wherein the personal data contents are assigned information relating to the name and/or the address of the user, the destination, the route and/or telemetry data.

7. The method of claim 1, wherein the plurality of data release classes comprise at least one data release class which is assigned no data contents and/or wherein the plurality of data release classes have a ranking, and a higher-ranking data release class comprises the data contents of the lower-ranking data release classes.

8. The method of claim 1, further comprising one, more or all of the following:

displaying the data contents assigned to a data release class, by the transportation vehicle-internal man-machine interface and/or the transportation vehicle-external man-machine interface;

displaying the data release class respectively selected for the one or more mobile online services, by the transportation vehicle-internal man-machine interface and/or the transportation vehicle-external man-machine interface;

displaying the data contents, used by the one or more mobile online services, of a data release class by the transportation vehicle-internal man-machine interface and/or the transportation vehicle-external man-machine interface; and displaying a configuration overview of all the mobile online services and the data release class selected for the respective mobile online service, by the transportation vehicle-internal man-machine interface and/or the transportation vehicle-external man-machine interface.

9. The method of claim 1, wherein the configuration system respectively assigns to the one or more mobile online services for one or more data release classes one or more use functions and/or reception data items used by the user by the mobile online service when the corresponding data release class is selected.

10. The method of claim 1, wherein the configuration system respectively assigns to the one or more mobile online services for one or more data release classes one or more transmission data items which are processed and/or passed on by the mobile online service when the corresponding data release class is selected.

11. The method of claim 1, further comprising at least one of the following:

displaying the one or more use functions and/or reception data items used by the user by the mobile online service when the corresponding data release class is selected; and displaying the one or more transmission data items which are processed and/or passed on by the mobile online service when the corresponding data release class is selected.

12. The method of claim 1, wherein the configuration system comprises a configuration assistant which requests the user to answer a plurality of questions, wherein the configuration assistant respectively proposes an assignment of a data release class to the one or more mobile online services based on the responses given by the user.

13. The method of claim 12, wherein the configuration assistant has a memory on which a data release class which is to be proposed is stored for one or more mobile online services for each response combination of the user.

14. A configuration system for configuration of mobile online services for use with a transportation vehicle, the configuration system comprising a transportation vehicle having a transportation vehicle-internal configuration unit, and a transportation vehicle-external configuration unit, wherein the configuration system executes a method for configuring mobile online services for use with a transportation vehicle, the method comprising:

defining, by the configuration system at least two data release classes of a plurality of predetermined data release classes, wherein defining includes assignment of data contents to at least one of the at least two data release classes different from data contents assigned to another of the at least two data release classes;

enabling a selection input for a user by the configuration system, by which selection input the user respectively authorizes one or more mobile online services to use the data contents of at least one of the plurality of predetermined data release classes to increase transparency in the data to be released via simple instruction to increase the user's trust;

executing selection, according to user input via the selection input, of at least one data release class of the plurality of predetermined data release classes for the one or more mobile online services; and in response to executed selection, releasing the data contents of the selected data release class for use by the respective mobile online service by the configuration system, wherein the configuration system comprises a transportation vehicle-internal man-machine interface and/or a transportation vehicle-external man-machine interface for providing the selection input for the user of the configuration system, by which the user respectively permits the one or more mobile online services to use the data contents of the selected data release class.

15. The configuration system of claim 14, wherein the transportation vehicle-internal man-machine interface is assigned to a transportation vehicle-internal configuration unit, and the transportation vehicle-external man-machine interface is assigned to a transportation vehicle-external configuration unit, wherein the transportation vehicle-internal configuration unit and the transportation vehicle-external configuration unit are connected in a signal-conducting way to a central computer, and wherein the computer also comprises at least one of the following:

updating a configuration profile stored on the central computer in accordance with the configuration settings made by the transportation vehicle-internal configuration unit;

updating a configuration profile stored on the central computer in accordance with the configuration settings made by the transportation vehicle-external configuration unit;

retrieving a configuration profile stored on the central computer by the transportation vehicle-internal configuration unit and/or the transportation vehicle-external configuration unit; and selecting in each case one data release class for the one or more mobile online services by the configuration system in accordance with the retrieved configuration profile.

16. The configuration system of claim 14, wherein the plurality of data release classes comprise at least one data release class for environmental data contents, wherein the environmental contents are assigned information relating to the external temperature, the precipitation and/or the detected parking spaces.

17. The configuration system of claim 14, wherein the plurality of data release classes comprise at least one data release class for transportation vehicle data contents, wherein the transportation vehicle data contents are assigned information relating to the transportation vehicle type, the transportation vehicle identification number, a pseudonymized transportation vehicle number, the oil level, the engine temperature, the kilometer reading and/or fault reports.

18. The configuration system of claim 14, wherein the plurality of data release classes comprise at least one data release class for data contents which relate to the driving behavior of the user, wherein the data contents which relate to the driving behavior of the user are assigned information relating to the destination, route, telemetry data and/or sensor data.

19. The configuration system of claim 14, wherein the plurality of data release classes comprise at least one data release class for personal data contents, wherein the personal data contents are assigned information relating to the name and/or the address of the user, the destination, the route and/or telemetry data.

20. The configuration system of claim 14, wherein the plurality of data release classes comprise at least one data release class which is assigned no data contents and/or wherein the plurality of data release classes have a ranking, and a higher-ranking data release class comprises the data contents of the lower-ranking data release classes.

21. The configuration system of claim 14, wherein the method further comprising one, more or all of the following:

displaying the data contents assigned to a data release class, by the transportation vehicle-internal man-machine interface and/or the transportation vehicle-external man-machine interface;

displaying the data release class respectively selected for the one or more mobile online services, by the transportation vehicle-internal man-machine interface and/or the transportation vehicle-external man-machine interface;

displaying the data contents, used by the one or more mobile online services, of a data release class by the transportation vehicle-internal man-machine interface and/or the transportation vehicle-external man-machine interface; and displaying a configuration overview of all the mobile online services and the data release class selected for the respective mobile online service, by the transportation vehicle-internal man-machine interface and/or the transportation vehicle-external man-machine interface.

22. The configuration system of claim 14, wherein the configuration system respectively assigns to the one or more mobile online services for one or more data release classes one or more use functions and/or reception data items used by the user by the mobile online service when the corresponding data release class is selected.

23. The configuration system of claim 14, wherein the configuration system respectively assigns to the one or more mobile online services for one or more data release classes one or more transmission data items which are processed and/or passed on by the mobile online service when the corresponding data release class is selected.

24. The configuration system of claim 14, wherein the method further comprises at least one of the following:

displaying the one or more use functions and/or reception data items used by the user by the mobile online service when the corresponding data release class is selected; and displaying the one or more transmission data items which are processed and/or passed on by the mobile online service when the corresponding data release class is selected.

25. The configuration system of claim 14, wherein the configuration system comprises a configuration assistant which requests the user to answer a plurality of questions, wherein the configuration assistant respectively proposes an assignment of a data release class to the one or more mobile online services based on the responses given by the user.

26. The configuration system of claim 14, wherein the configuration assistant has a memory on which a data release class which is to be proposed is stored for one or more mobile online services for each response combination of the user.

\* \* \* \* \*